(12) United States Patent
Riant et al.

(10) Patent No.: US 6,381,069 B1
(45) Date of Patent: Apr. 30, 2002

(54) FIBER BRAGG GRATING OPTICAL FILTER WITH A CONSTANT GROUP-DELAY RESPONSE IN ITS WORKING BAND

(75) Inventors: Isabelle Riant; Pierre Sansonetti, both of Palaiseau (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/594,846

(22) Filed: Jun. 15, 2000

(30) Foreign Application Priority Data

Jul. 8, 1999 (FR) .............................. 99 08845

(51) Int. Cl.[7] .............................. G02B 5/18; G02B 6/34
(52) U.S. Cl. ........................ 359/569; 359/572; 359/575; 385/37; 385/123
(58) Field of Search ................. 359/569, 572, 359/575, 161; 385/24, 33, 37, 123, 124

(56) References Cited

U.S. PATENT DOCUMENTS

| 5,404,413 | A | | 4/1995 | Delavaux et al. |
| 5,499,134 | A | | 3/1996 | Galvanauskas et al. |
| 5,608,571 | A | * | 3/1997 | Epworth et al. ............ 359/341 |
| 6,201,907 | B1 | * | 3/2001 | Farries ........................ 385/24 |
| 6,266,463 | B1 | * | 7/2001 | Laming et al. ............... 385/37 |

FOREIGN PATENT DOCUMENTS

EP 0 924 884 A2 6/1999

OTHER PUBLICATIONS

T. Komukai et al.: "Fabrication of non–linearly chirped fiber bragg gratings for higher–order dispersion compensation" OFC '1998 Technical Digest, vol. 2, Feb. 22, 1998, pp. 71–72, XP002134712.

Loh, W. H. et la.: "Dispersion Compensation over Distances in Excess of 500 KM For 10–GB/S Systems Using Chirped Fiber Gratings" IEEE Photonics Technology Letters, US, IEEE Inc., New York, vol. 8, No. 7, Jul. 1, 1996, pp. 944–946, XP000595628.

F. Ouellette: "Dispersion cancellation using linearly chirped bragg grating filters in optical waveguides" Optics Letters, vol. 12, No. 10, Oct. 1987, pp. 847–849, XP002134713 Optical Society of America, Washington, US.

\* cited by examiner

*Primary Examiner*—Jon Henry
(74) *Attorney, Agent, or Firm*—Sughrue Mion, PLLC

(57) ABSTRACT

The invention relates to the field of optical fiber wavelength division multiplexed transmission, and more particularly to the field of narrow-band optical filters for dense multiplexing. The invention proposes a narrow-band optical filter with a group-delay response that is very flat in the working band, obtained by cascading two Bragg gratings having group delays that are linear as a function of wavelength in the working band, but with their gradients being of opposite signs. The present solution is easier and less costly to implement than the prior art solutions, and it should also offer higher performance.

3 Claims, 6 Drawing Sheets

FIBER BRAGG GRATING OPTICAL FILTER WITH A CONSTANT GROUP-DELAY RESPONSE IN ITS WORKING BAND

The invention relates to the field of optical fiber telecommunications. In order to increase the capacity of optical fiber telecommunications systems, the current trend is to use a certain number of transmission channels simultaneously on slightly different wavelengths, using a scheme referred to as "wavelength division multiplexing" or "WDM". Among the various components necessary for forming such a WDM system, optical multiplexers are essential to enable optical signals to be added to and/or dropped from the transmission line (optical fiber) at given wavelengths.

BACKGROUND OF THE INVENTION

Such filters are known to the person skilled in the art as "optical add-drop multiplexers" or "OADMs", this term being used in the description below.

An OADM may be formed by cascading two functions: i) wavelength selection (filter); and ii) coupling between the transmission line and an input/output branch thereof. The two functions can be performed by a single optical component (a fiber coupler with a Bragg grating in the coupling region) or by an assembly comprising a plurality of components (a Bragg filter, and an optical circulator, for example). In WDM systems with a large number of channels having narrow wavelength spacing, i.e. "dense WDM" or "DWDM", the optical filters must be very narrow (~0.2 nm) with steep edges ($\mu$0.1 nm).

A problem encountered when such filters are formed by inscribing a Bragg grating in an optical fiber is a high increase in chromatic dispersion at the borders of the working band of the filter. The excessive chromatic dispersion gives rise to unacceptable widening of the light pulses and penalizes transmission performance, thereby imposing a lower limit for spacing between the WDM channels, and thus an upper limit on the number of channels that can be transmitted in a given bandwidth.

Document D1, G.Nykalak et al., "Impact of fiber grating dispersion on WDM system performance", OFC '98 Technical Digest, paper TuA3, pp. 4–5 (1988) demonstrates that problem experimentally, with the conclusion that chromatic dispersion at the borders of the bands of fiber Bragg grating (FBG) filters can be detrimental to the capacity of a DWDM system because it imposes a limit on the relationship between the width of the WDM channels and their spacing (spectrum use).

A partial solution to that band border problem is proposed in Document D2, M. Ibsen et al., "Optimised square passband fibre Bragg grating filter with flat group-delay response", Elec. Lett. 34 (8) pp. 800–802 (Apr. 16, 1998). According to the teaching of D2, the refractive index profile is modulated using a "sinc" ($x^{-1}$ sin x) function that is truncated (because it is of finite length). Gaussian apodization makes it possible to overcome "Gibbs' phenomenon" at least in part, i.e. an increase in the reflectivity of the Bragg grating at the borders of the band.

Other teaching of the prior art concerns the cascading of two non-linear Bragg filters for compensating high-order dispersion. In order to broaden the working band of dispersion compensators, in particular third-order dispersion compensators, Document D3, T. Komukai et al., OFC '98 Technical Digest, pp. 71–72, session TuM2, (1998), proposes to concatenate Bragg filters with inverted non-linear "chirps". The word "chirp" is used by the person skilled in the art to designate a monotonic variation in group delay with varying wavelength. It can be obtained by varying the pitch of the Bragg grating along the filter. Cascading filters with inverted chirps means that the group delay increases with increasing wavelength in one of the filters, and decreases with increasing wavelength in the other filter.

The two solutions proposed in Documents D2 and D3 remain difficult to implement industrially, hence the need to find a solution that is easier to implement.

OBJECTS AND SUMMARY OF THE INVENTION

An object of the present invention is to mitigate the problems presented by the solutions known from the prior art, either as regards performance obtained, or as regards the ease with which industrial implementation is possible.

To these ends, the invention provides a Bragg grating optical filter device having a broad working band, and having a group delay that is flat in the working band, as defined in claim 1. According to claim 1, there are two Bragg gratings in series, each of which has approximately linear chirp that is inverted relative to the chirp of the other filter along the length of the filter.

In a particular embodiment, the two Bragg filters are connected successively between an input port and output port by means of a four-port circulator.

In another embodiment, the two Bragg filters are connected between the input port and the output port by two three-port optical circulators connected together by a light guide.

BRIEF DESCRIPTION OF THE DRAWINGS

Other characteristics and advantages of the invention will appear on reading the following detailed description with reference to the accompanying figures, in which.

MORE DETAILED DESCRIPTION

In all of the figures, like references designate like elements. The drawings are not always to scale, for reasons of clarity.

Figure 1:
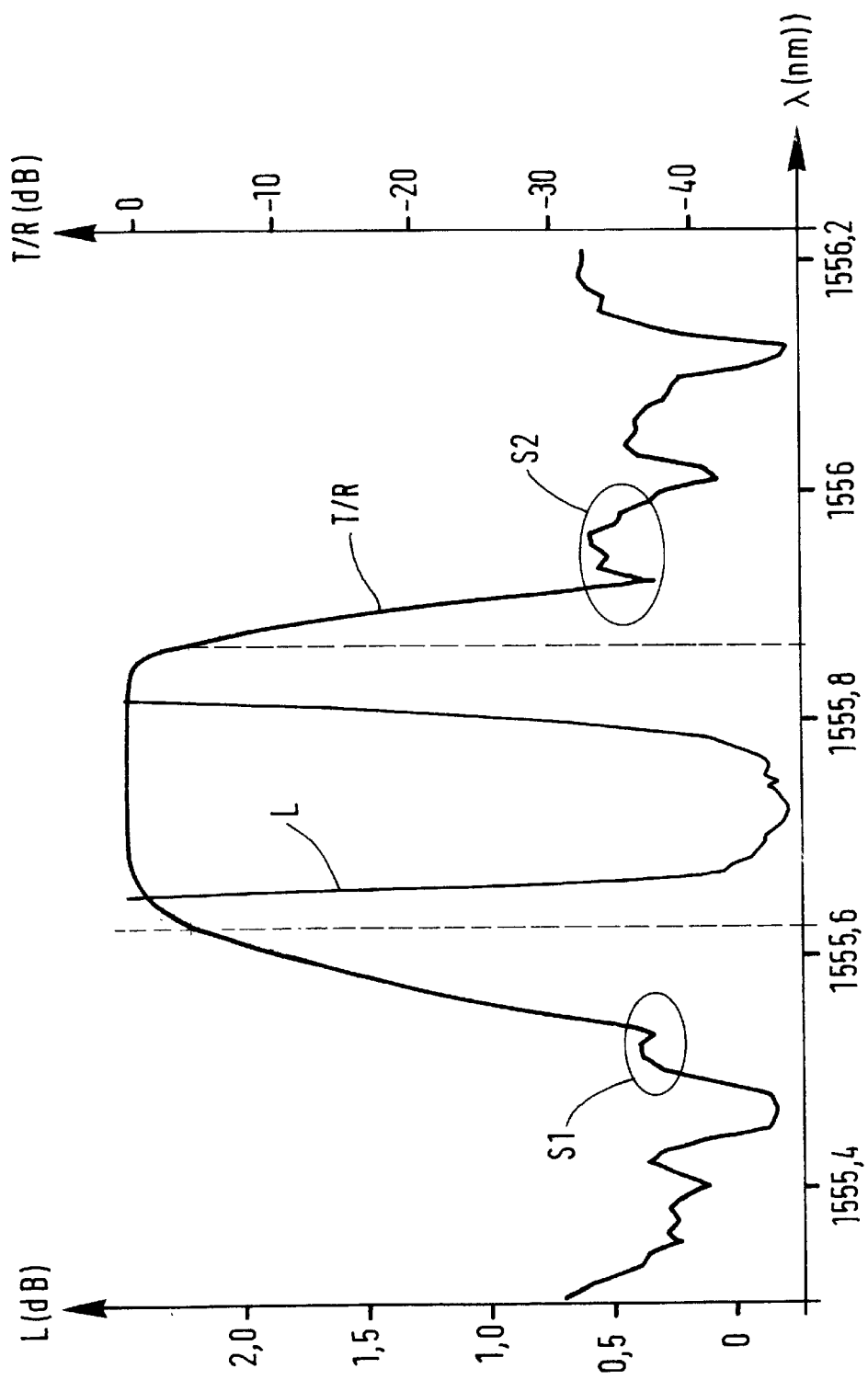
FIG. 1 (D1, FIG. 2) shows the losses at the borders of the working band for a prior art narrow-band Bragg filter.

In FIG. 1, on the left scale, the curve (L) shows loss in dB as a function of the center wavelength of a wave propagating in a narrow Bragg filter for an error rate of $10^{-9}$ at 10 Gbit/s. On the right scale, the reflection spectrum (T/R) of the same filter is shown, expressed as the ratio between transmission and reflection in dB. In dashed lines, the −3 dB width of the filter is shown. By superposing the two curves, compared with the −3 dB width, it can be observed that losses become large at the borders of the working band, and can even penalize performance inside the transmission band of the Bragg grating.

In addition, it can be observed that, on either side of the working band, there exist transmission rises S1 and S2 which can disturb transmission over neighboring channels in a DWDM system.

Figure 2:
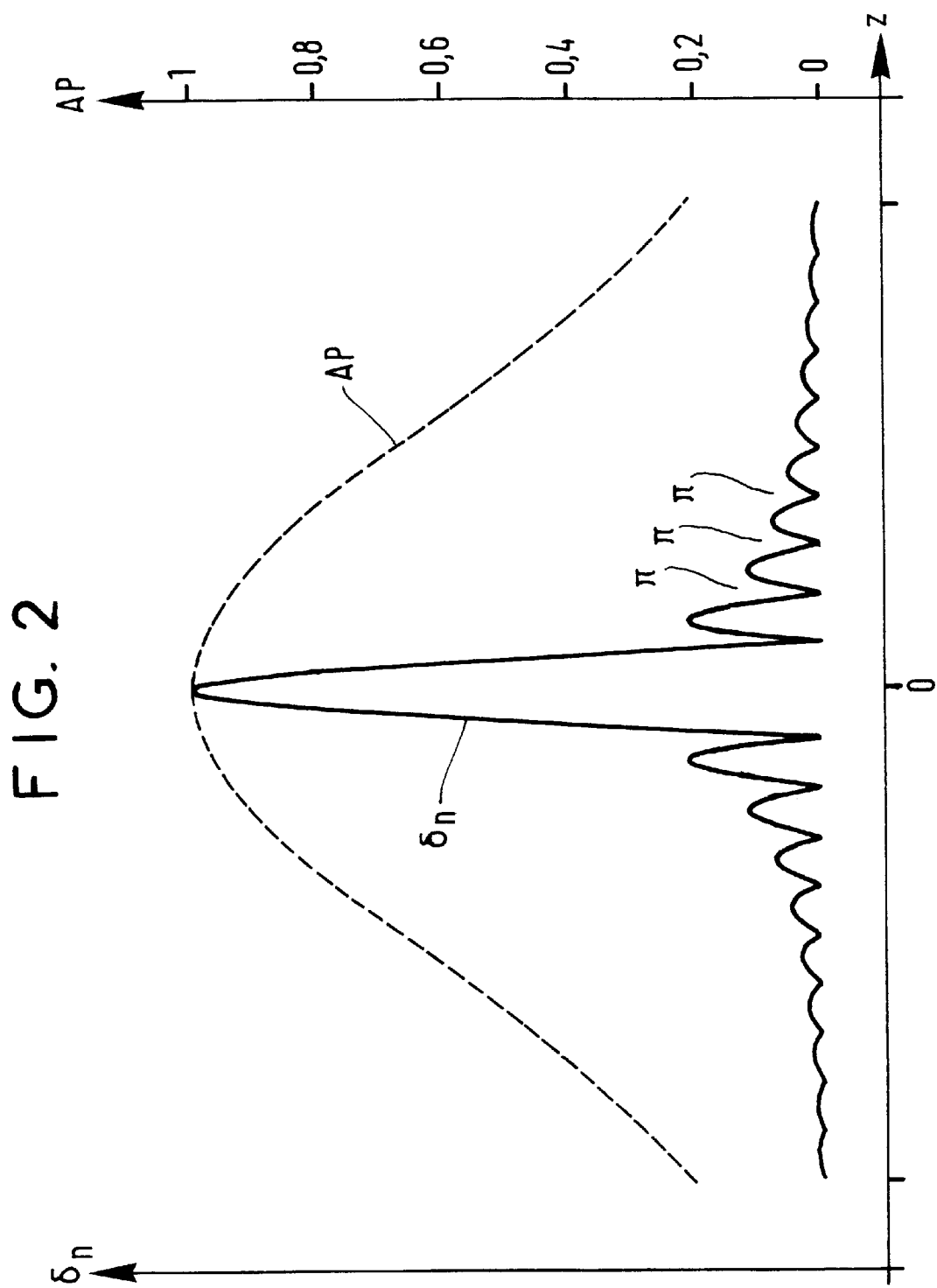
FIG. 2 (D2, FIG. 1) shows the refractive index variation profile of a narrow-band Bragg filter with $x^{-1}$ sin (x) modulation about the center of the filter, and the profile of a Gaussian apodization applied to the $x^{-1}$ sin (x) profile to obtain a flat response in the working band in the prior art.

FIG. 2 shows an example of variations δn in the refractive index of an $x^{-1}$ sin (x) Bragg grating, where x=pπz, p being an integer, subjected to apodization with a Gaussian function AP of the form $\exp(-a^2z^2)$ shown in dashed lines. The apodization is applied to minimize the effect of the finite length of the Bragg grating, and thus to obtain a filter having edges that are steeper in its reflection spectrum. To obtain the effect equivalent to alternate regions of positive and "negative" index, a phase shift of π is imparted at each refractive index minimum when manufacturing the Bragg grating, as shown in FIG. 2.

The group delay measured by the authors of D2 on a filter having the characteristics shown diagrammatically in FIG. 2 is relatively flat over a large portion of the working band of the Bragg filter. However, the variation in the group delay at the borders of the working band remains large, and imparts chromatic dispersion that can be detrimental to the quality of the DWDM transmission. Quality is parameterized by transmission error rate, transmission data rate, the distance between repeaters or between a transmitter and a receiver in a link without a repeater; and the number of WDM channels per spectrum unit, which depends on the width and the spacing of the channels in terms of wavelength.

Figure 3:
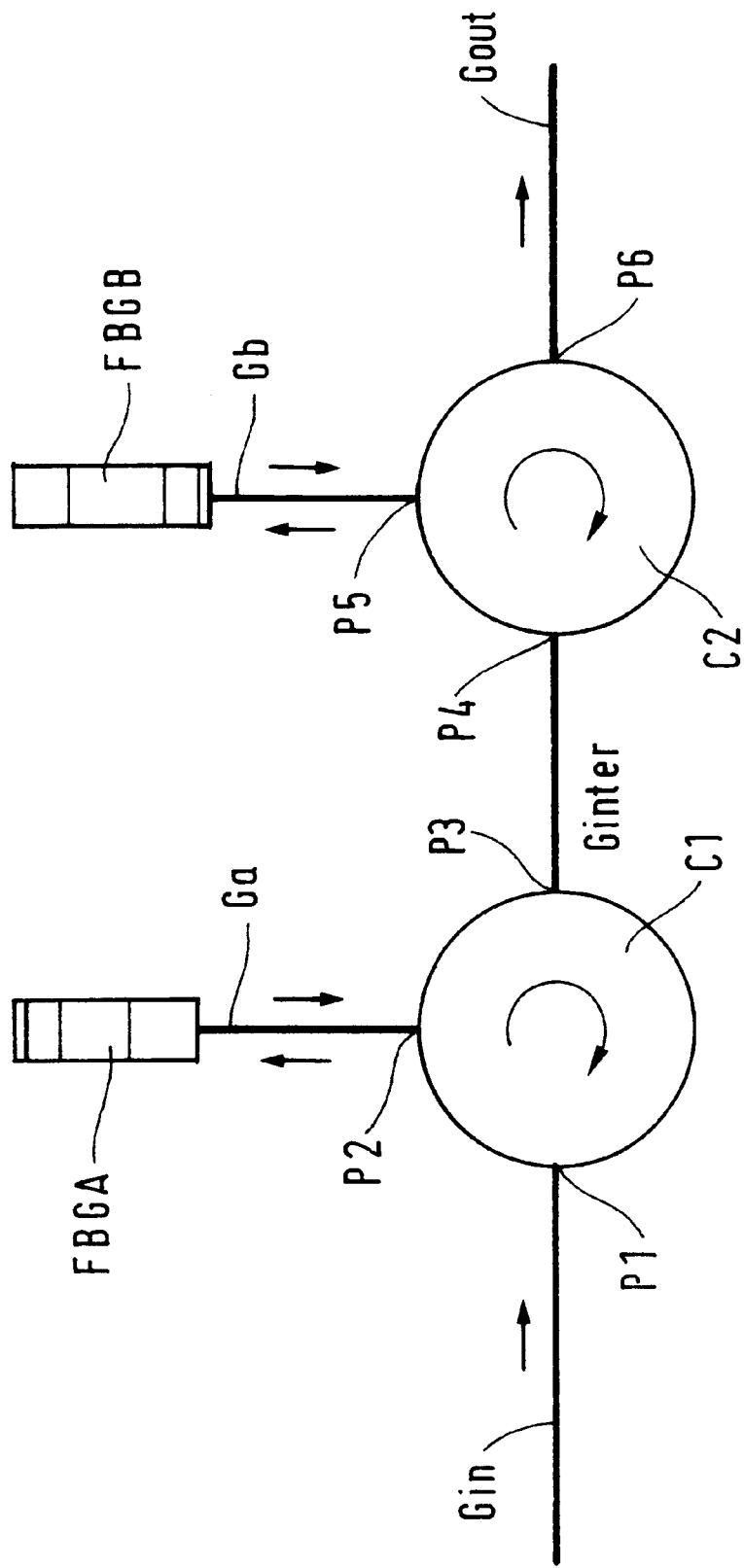
FIG. 3 (D3, FIG. 1) is a diagram showing the cascading of two Bragg filters having non-linear chirps in the prior art.

FIG. 3 is a diagram showing the cascading of two prior art Bragg filters having non-linear chirps as described in Document D3. The light signal enters via the light guide Gin into the first three-port optical circulator C1 via port P1, and the circulator C1 delivers the signal via port P2 to the guide Ga. The signal is reflected by the first filter FBGA in the band of the filter, and it returns to port P2 via the same light guide Ga with the group delay that is imparted by the non-linear chirp of the filter FBGA. This chirped signal passes through the circulator C1. It is then delivered via port P3 to the light guide Ginter and it enters the second three-port circulator C2 via port P4. It exits from the second circulator via port P5 into the light guide Gb leading to the second Bragg filter FBGB. The second Bragg filter FBGB has non-linear chirp that is inverted relative to the chirp of the first filter FBGA. The signal is reflected by the second filter FBGB along the light guide Gb to port P5 of the circulator C2, with a group delay that includes the combined influence of the non-linear chirps imparted by the two filters FBGA and FBGB. The output signal is delivered by the circulator C2 via port P6 to the guide Gout, still with the combined influence on the group delay of the non-linear chirps imparted by the two filters FBGA and FBGB.

Figure 4:
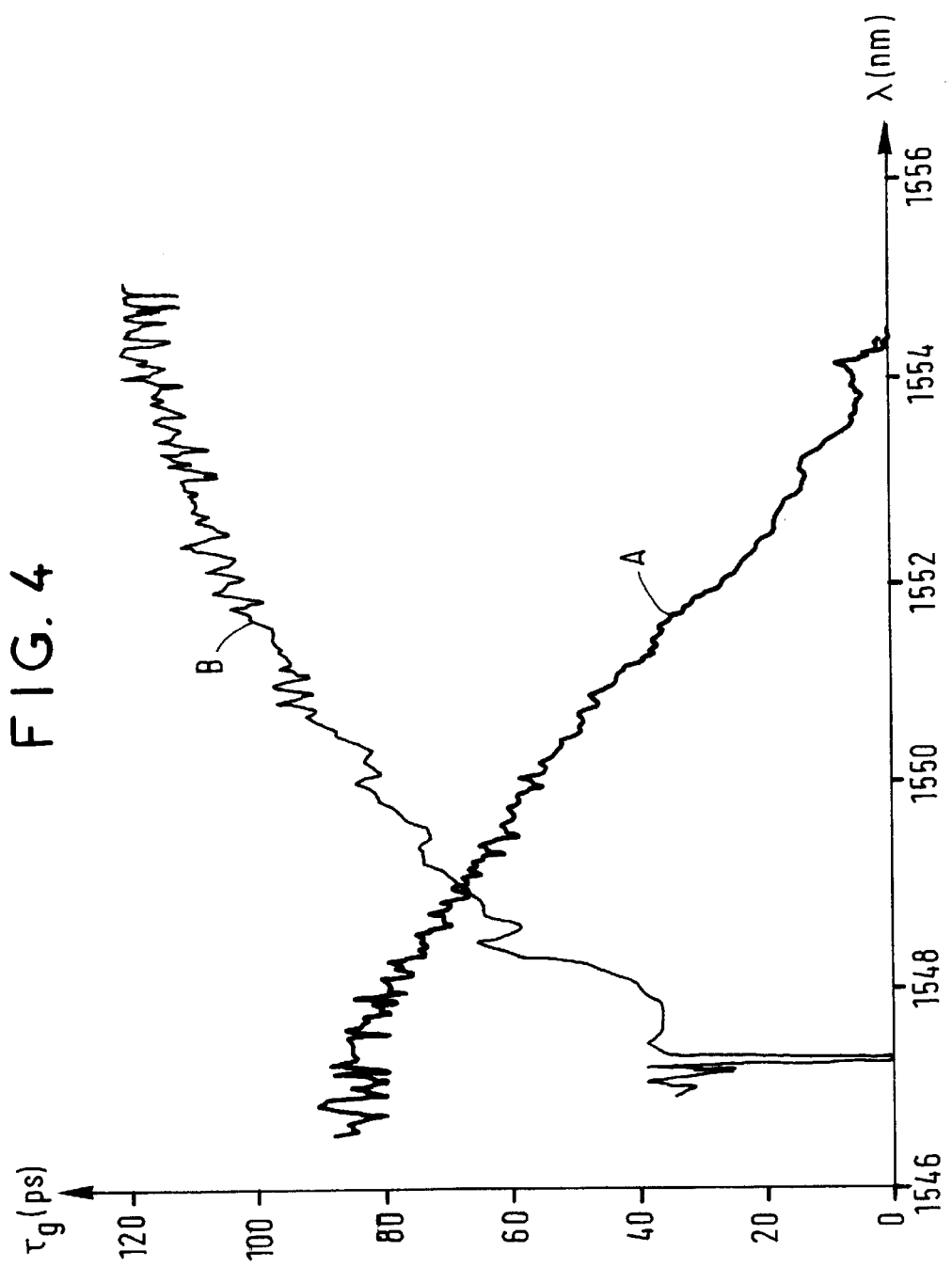
FIG. 4 (D3, FIG. 2) shows the non-linear chirps used in the D3 experiment illustrated by the preceding figure.

FIG. 4 shows the group delay measurements made on the two filters FBGA and FBGB in the experiment of Document D3. The curve A corresponds to the non-linear chirp imparted by the FBGA filter of FIG. 3, and the curve B corresponds to the non-linear chirp imparted by the filter FBGB. Apart from the oscillations which are due, according to the authors, to imperfect $x^{-1}$ sin (x) apodization, the chirp measured is of parabolic (quadratic) form.

The group delay characteristic resulting from the cascading of the two filters presents an improvement over the other solutions known from the prior art, but it has oscillations and a non-zero group delay gradient as a function of wavelength at the borders of the working band. In addition, making such filters successfully is difficult even individually, and could become uncertain on an industrial scale.

To mitigate the drawbacks of the prior art, the invention proposes to concatenate two filters having opposite chirp, wherein the two chirps are approximately linear and of gradient that is equivalent except for its sign. These chirps are shown diagrammatically in FIG. 5, and the chirp resulting from the cascading of the two filters is shown in FIG. 6.

Figure 5:
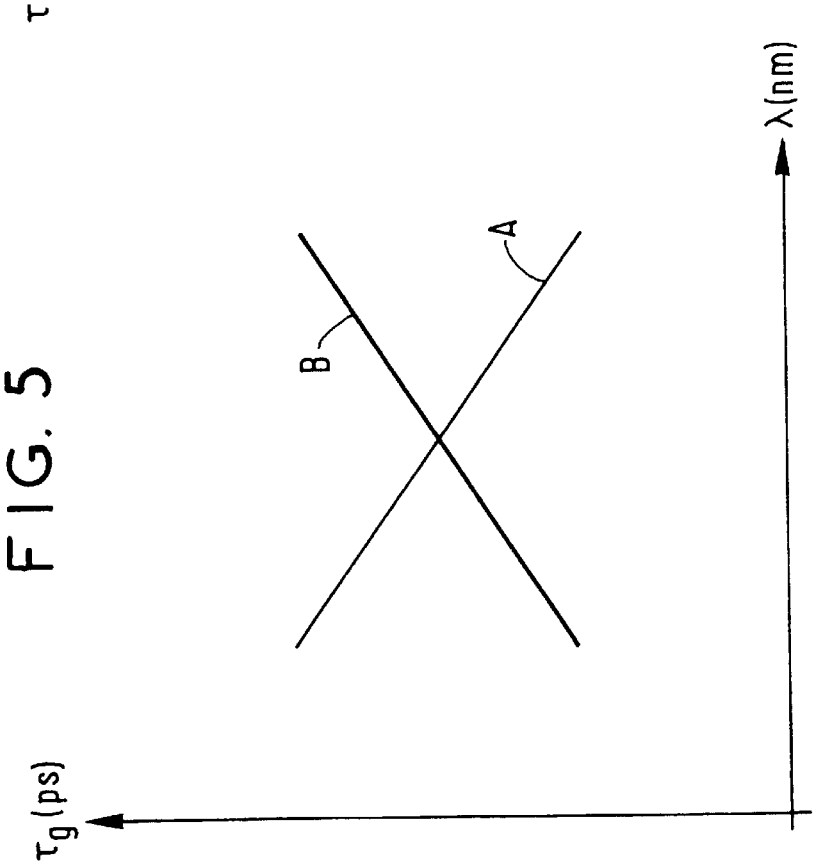
FIG. 5 is a diagram showing the chirps of the two Bragg filters the invention.

FIG. 5 shows the group delay as a function of wavelength of two filters FBGA and FBGB of the invention. Curve A corresponds to almost linear chirp having a gradient of about 10 ps/nm, for example. Curve B corresponds to almost linear chirp having a gradient of about −10 ps/nm, for example.

Figure 6:
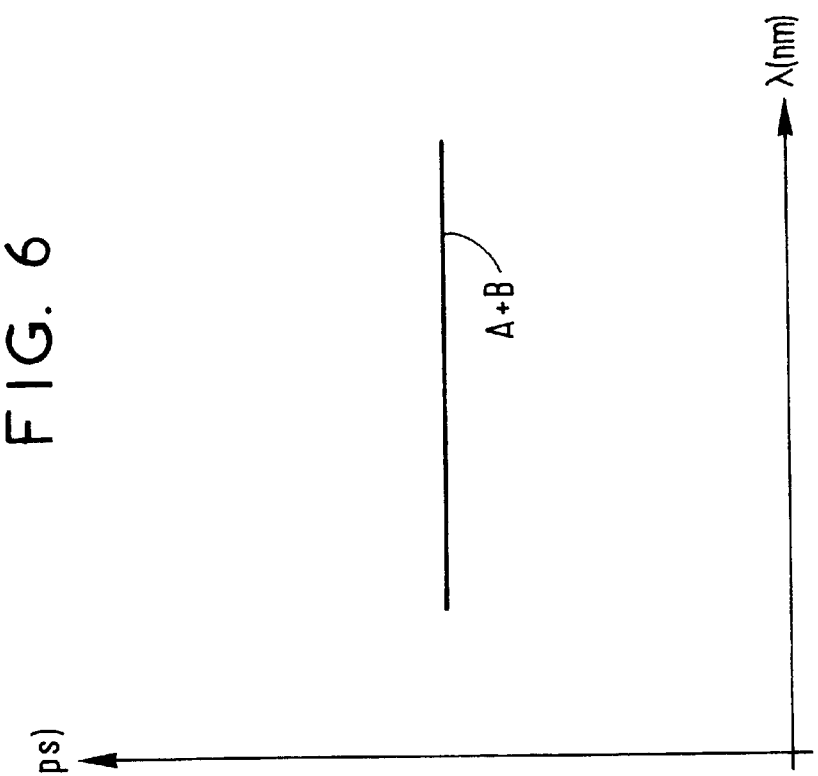
FIG. 6 shows the dispersion resulting from the cascading of two Bragg filters as shown in the preceding figure.

The group delay characteristic resulting from the cascading of the two filters presents a group delay that is almost uniform throughout the working band of the filter, as shown diagrammatically in FIG. 6.

The linear-chirp filters FBGA and FBGB may be connected in the same way as the non-linear chirp filters of the prior art, by means of two three-port optical circulators, as shown in FIG. 3. Or else, they may be connected by means of a single three-port optical circulator, as shown in FIG. 7.

Figure 7:
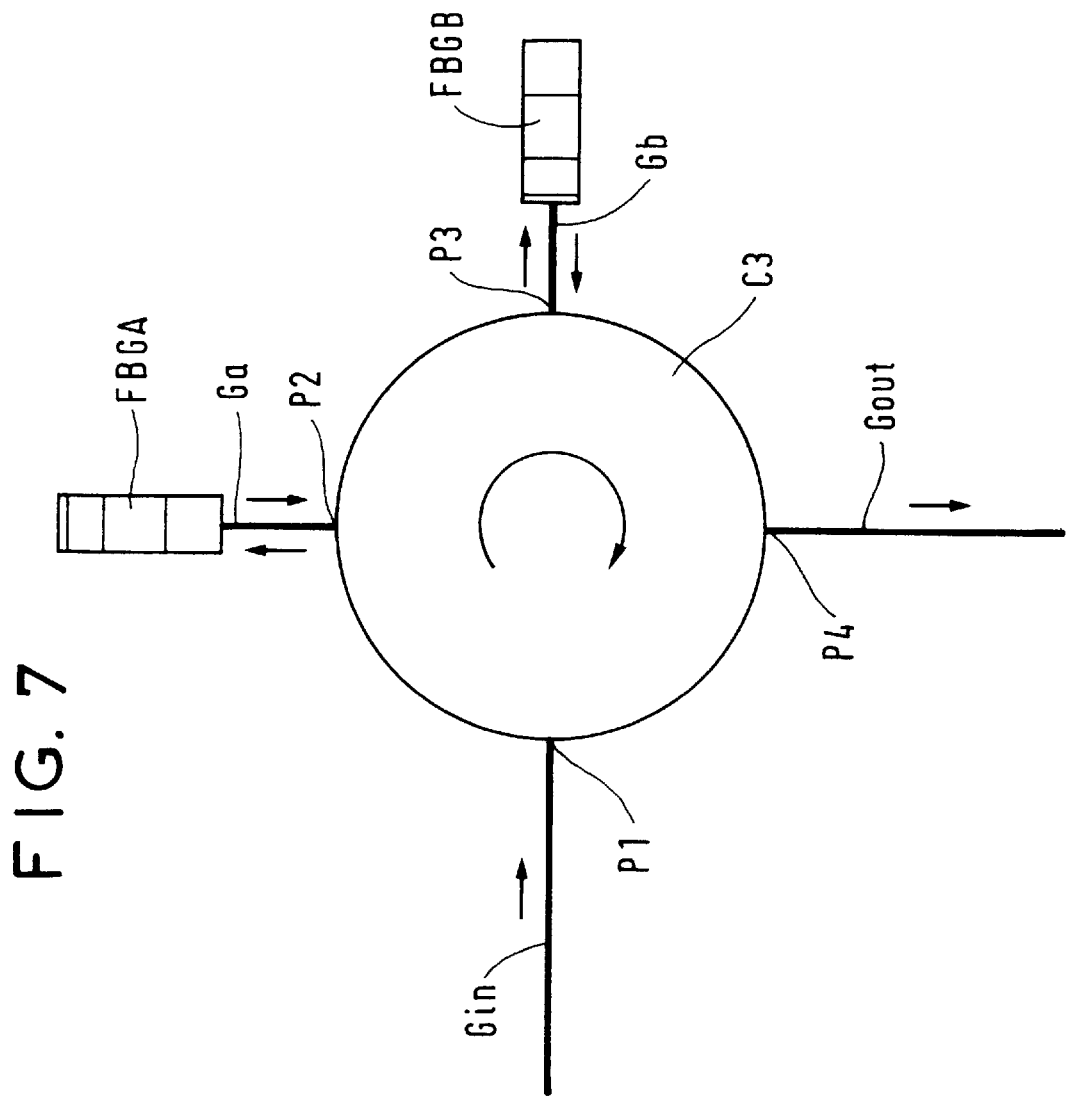
FIG. 7 is a diagram showing a preferred embodiment of the invention.

FIG. 7 is a diagram showing the cascading of two linear-chirp Bragg filters of the invention. The light signal enters the four-port circulator C3 via the light guide Gin and via port P1, and the circulator C3 delivers the signal via port P2 to the guide Ga. The signal is reflected by the first filter FBGA in the band of the filter, and it returns to port P2 via the same guide Ga with the group delay that is imparted by the linear chirp of the filter FBGA. The chirped signal passes through the circulator C3. It is then delivered via port P3 and along the guide Gb to the second Bragg filter FBGB. The second Bragg filter FBGB has linear chirp that is inverted relative to the first filter FBGA. The signal is reflected by the second filter FBGB along the guide Gb to port P3 of the circulator C3, with a group delay that includes the combined influence of the linear chirps imparted by the two filters FBGA and FBGB. The output signal is delivered by the circulator C3 via port P4 to the guide Gout, still with the combined influence on the group delay of the linear chirps of opposite gradients imparted by the two filters FBGA and FBGB. When these two gradients are added together, they cancel each other out, and the output signal has a zero gradient, i.e. the group delay is flat in the band of the filter, as shown in FIG. 6.

The person skilled in the art can easily imagine other configurations for the elementary components necessary for implementing the invention.

The results that can be obtained with the device of the invention are better than those obtained with the prior art devices.

Another major advantage of such a device is that it is easy to make, because the linear chirp is easier to generate than a quadratic chirp, and much easier than a an apodization of an $x^{-1}$ sin (x) function with phase shifts of π at each minimum. This means that it is made easier to use on an industrial scale by means of increased reliability of the results obtained, of lower manufacturing cost, and of higher performance.

What is claimed is:

1. A Bragg grating optical filter device having a group delay that is flat in the working band of width Δλ around a center wavelength $\lambda_C$, said device having an input light guide, an output light guide, at least one optical circulator, and two fiber Bragg grating filters on light guides of center wavelength around the same center wavelength $\lambda_C$, and of reflection band width $\Delta\lambda_B \geq \Delta\lambda$; said Bragg gratings having almost periodic variations $\Delta n_1$ in refractive index along the propagation axis of said light guide, said gratings having chirp, said chirp being a monotonic variation in the pitch of the index variation $\Delta n_1$ along the axis, the two Bragg gratings having inverted chirp characteristics, wherein said chirp characteristics are approximately linear as a function of position along the propagation axis within each grating, and $\Delta\lambda_B \sim \Delta\lambda$.

2. A Bragg grating optical filter device according to claim 1, wherein said optical circulator is a four-port circulator, and wherein the circulator connects successively said input light guide, said Bragg gratings in cascade, and said output light guide.

3. A Bragg grating optical filter device according to claim 1, wherein two three-port optical circulators are interconnected via an interconnection light guide so as to connect together successively said input light guide, one of said Bragg gratings, said interconnection light guide, the other of said Bragg gratings in cascade, and said output light guide.

* * * * *